April 1, 1924.

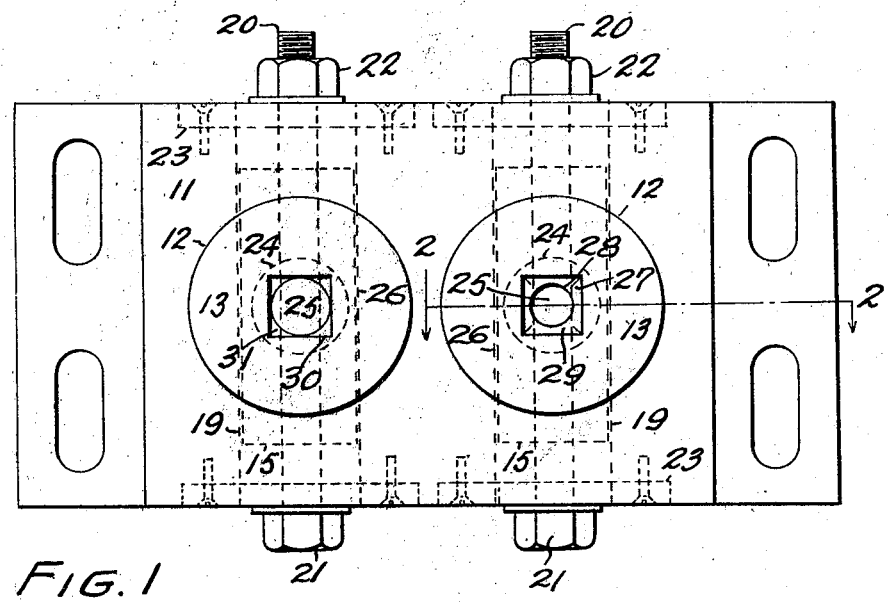
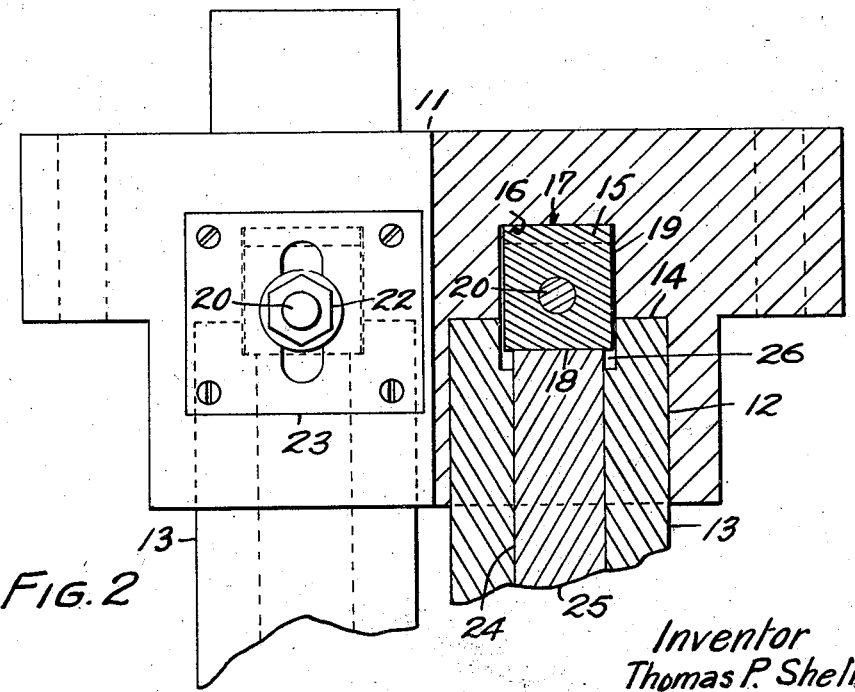

T. P. SHELLY 1,488,558

BOLT MAKING MACHINE

Filed Nov. 23, 1920    3 Sheets-Sheet 2

Inventor
Thomas P. Shelly
By Fetherstonhaugh & Co
Attys.

April 1, 1924.
T. P. SHELLY
1,488,558
BOLT MAKING MACHINE
Filed Nov. 23, 1920    3 Sheets-Sheet 3
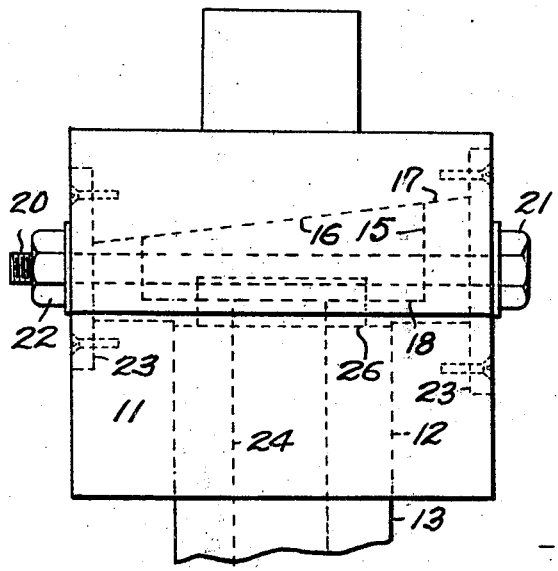
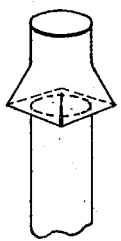
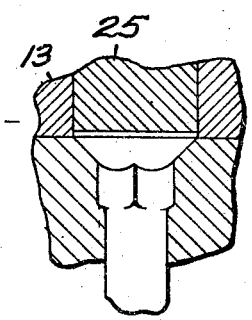
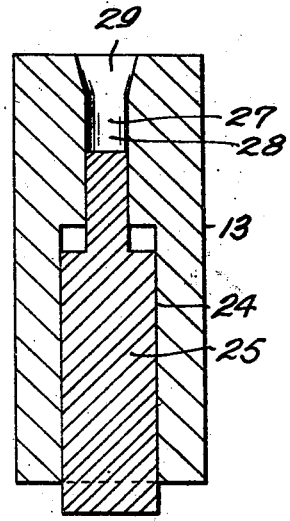
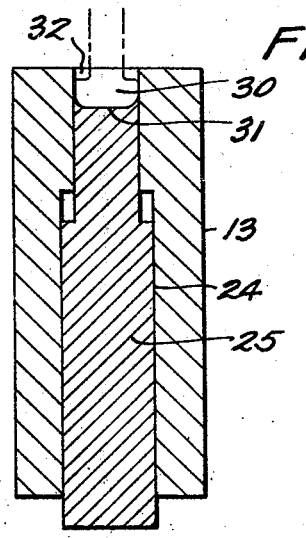
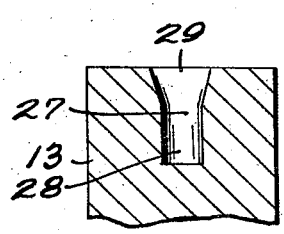
Inventor
Thomas P. Shelly
By
Attys.

Patented Apr. 1, 1924.

1,488,558

UNITED STATES PATENT OFFICE.

THOMAS P. SHELLY, OF LACHINE, QUEBEC, CANADA, ASSIGNOR TO MONTREAL BOLT AND FORGING COMPANY LIMITED, OF MONTREAL, QUEBEC, CANADA, A CORPORATION.

BOLT-MAKING MACHINE.

Application filed November 23, 1920. Serial No. 425,963.

*To all whom it may concern:*

Be it known that I, THOMAS P. SHELLY, a subject of the King of Great Britain, and resident of the city of Lachine, in the Province of Quebec and Dominion of Canada, have invented certain new and useful Improvements in Bolt-Making Machines, of which the following is a full, clear, and exact description.

This invention relates to improvements in process and apparatus for making bolts, and relates particularly to the manufacture of hot pressed bolts.

The object of the invention is to provide for the manufacture of different sizes and shapes of bolts but particularly large bolts by means of automatic machinery.

A further object is to provide for the manufacture with great economy of time and material and with the production of a more nearly perfect product than is possible by the methods now in use.

At the present time bolts are made by both the hot and the cold processes. For a variety of reasons it is not possible to manufacture medium or large sized bolts by cold pressing and the process is therefore confined to small sizes. The larger sizes of bolts are all hot forged and the method of forging depends to a large extent upon the shape of head. Carriage bolts having round heads may be made on substantially automatic machinery which will cut off a hot bar to proper length and upset the end of the bar in one or more blows to form the head. Fairly good results are obtainable by this method but the bolts are very liable to have a flash or fin of surplus metal round the head, this applies particularly to bolts which are headed in a single stroke or to bolts which have a square shoulder under the head, and the reason for it is, that in order to secure a properly filled die and properly formed head it is necessary to provide a surplus of metal, which surplus squeezes out between the gripping and heading dies forming the flash referred to. A slight flash may be tolerated on a carriage bolt but on round or square headed plow bolts or on other shapes the flash cannot be tolerated and must be trimmed off. This trimming is an expensive operation, the bolts when cold being fed singly by hand into a trimming machine. Obviously, if this operation can be avoided the cost of producing the bolts will be greatly reduced.

Square or hexagon head bolts cannot be satisfactorily cold pressed except by way of pressing a round head or a larger polygonal head than is required and then finishing the bolt in a subsequent trimming operation. By this method square or hexagon head bolts in small sizes may be made either hot or cold on automatic machinery but the trimming operation cannot be avoided, wherefore the manufacture is an expensive proceeding although less so than the manufacture of the larger sizes. In making large size square or hexagon head bolts the metal is cut to the length and the blanks heated and fed by hand between gripping dies which hold the metal while it is being upset and the upset portion forged to shape. In making a square head bolt the heading is largely accomplished by means of five simultaneously operating hammers which drive simultaneously against the metal to form the five outer faces of the head, the sixth face of course resting against the gripping die. A hexagon head bolt is manufactured in the same way. It is usually necessary in the manufacture of square head bolts, and invariably so in the manufacture of hexagon heads, to shift the half-formed bolt from a set of roughing dies to finishing dies and as this is a hand operation it is slow and, to a considerable extent, uncertain. It will therefore be seen that the operation of making a square or hexagon head bolt comprises feeding a hot bar by hand to a gripping die, closing the gripping die and starting the machine to rough form the head, stopping the machine, opening the gripping die, shifting the bolt by hand to a second gripping die, closing the die, starting the machine again to finish the forming and lastly stopping the machine, opening the gripping die and removing the bolt. Obviously, even the most skilled workman cannot make a bolt by such methods at anything like the speed that would be possible with an automatic machine.

According to the present invention bolts having any shape of head may be made automatically and at a high rate of speed. Different shapes of heads may be perfectly formed in the process of making so that no subsequent trimming operation is required, thus avoiding the expenditure of time and loss of material incident to trimming. Obviously, an automatically operated machine will have a very much larger output than is possible by the hand process and a further advantage is found in the fact that one operator can supervise a number of automatic machines, whereas each hand operated machine requires an operator to make the bolts and another operator to keep him supplied with hot blanks. It will further be noted that, according to the present invention, all shapes of heads may be made on a single machine by merely changing the dies. A great saving in capital expense will result since a single set of machines will replace the several sets which are now necessary, i. e. machines for square and hexagon head bolts and entirely different machines for round and cone or flat head bolts.

According to the present invention any suitable type of automatic bolt or rivet machine is arranged in alignment with a continuous furnace through which the raw material passes from a coil of wire or in the form of mill length rods. The supply to the machine is thus continuous and the feeding device of the machines supplies material automatically at the necessary rate. Machines of the type suitable for putting into practice this process have a single gripping die and a double stroke head carrying two dies, one of which performs a preliminary operation on the metal and then gives place to the other which finally forms the bolt head. The successful operation of the process depends entirely upon suitable preliminary forming of the metal and the adaptability of the process to a full range of styles and sizes of heads and depends also upon certain novel features in the construction of the dies. The preliminary forming or blanking die is designed to upset the metal so as to fully form the under surface of a bolt head and also to produce any special shank formation. This roughing die leaves the extreme end of the stock in practically its original form and the heading operation proper is performed by the finishing die. A vital feature of the process lies in the shaping of the roughing die to produce a certain definite result or effect, a definite preliminary step without which the head cannot be satisfactorily formed. The perfection of result and considerable economy in capital expense are obtained by so constructing the dies that the bottoms thereof are movable relative to the bodies, thus enabling fine adjustments to be made so that perfect heads are formed and trimming operations eliminated. It will be understood, however, that once the exact adjustment necessary to obtain a given result has been arrived at, solid dies duplicating the form and dimensions of the adjustable dies may be made and used without departing in one sense from the spirit of the invention. The dies themselves are mounted in a holder carrying wedges adjustable by means of screws, which wedges form the seats of the movable die bottoms, the bodies of the dies being independently supported in the holder, so that by adjusting the wedges the die bottoms may be moved in and out to regulate the depth of the dies and therefore the depth of the head which will be formed thereby.

In the drawings which illustrate the invention:—

Fig. 1 is a front elevation of the die block with the dies in position therein.

Figure 2A:
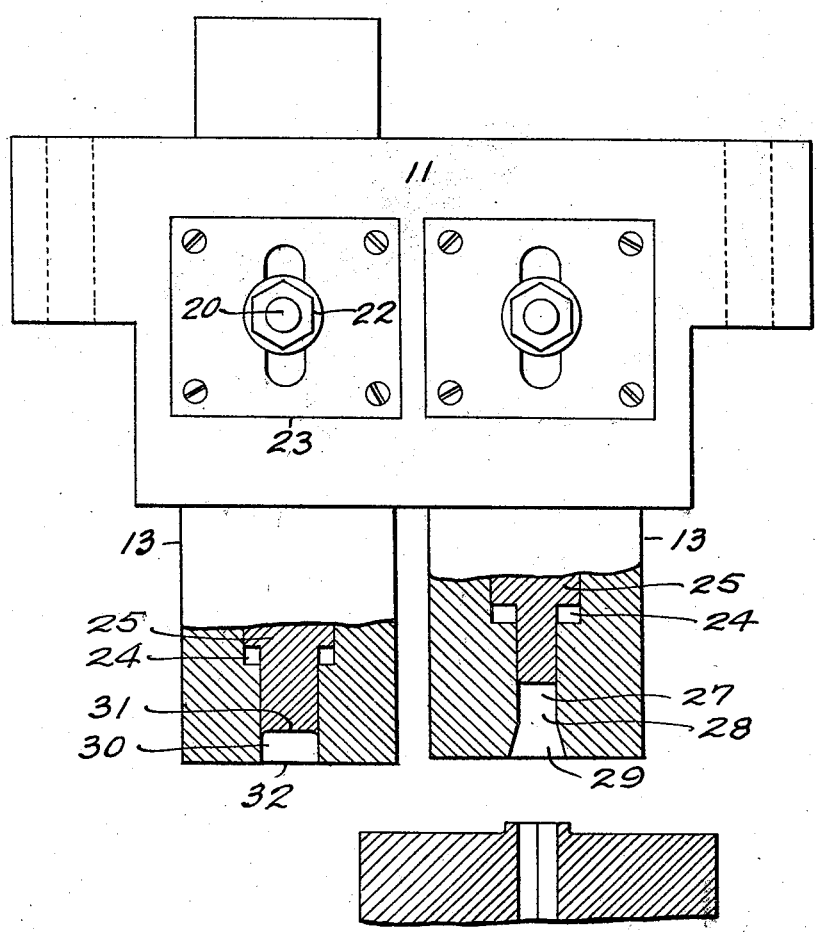
Fig. 2 is a view showing on the left a half plan and on the right a section on the line 2—2, Figure 1.

Fig. 2ᵃ is a view partly in section and partly in elevation, illustrating the interior construction of the dies.

Fig. 3 is an end elevation of the device.

Figs. 4 and 5 are longitudinal sectional views of the roughing and finishing dies respectively.

Fig. 6 is a sectional view of a solid roughing die.

Fig. 7 is a perspective view illustrating the first step in the operation of producing a round headed bolt.

Fig. 8 is a perspective view illustrating the first step in the production of a square head bolt.

Fig. 9 is a perspective view illustrating the first operation in the production of a cone head bolt.

Fig. 10 is a fragmentary sectional view illustrating the finishing of a cone headed bolt.

Referring more particularly to the drawings, 11 designates a die block adapted for attachment to any suitable bolt machine and provided with a pair of suitably disposed recesses 12 for the reception of die bodies 13. The bottoms 14 of these recesses form seats for the die bodies. A wedge 15 is slidably mounted in the die block at the back of each recess 13. These wedges preferably extend across the die block, as shown in Figure 1, and are disposed with their inclined faces 16 bearing against similarly inclined surfaces 17 formed in the die block, so that the front surfaces 18 of the wedges will be perpendicular to the axes of the die bodies. As clearly shown in Figure 2, these wedges travel in slots 19 in the die block and are thereby held in alignment and against overturning. Each wedge is longitudinally bored and internally threaded to co-operate with a screw 20, which is journalled toward its ends in the die block but is not threaded thereinto. Each screw is provided at one end with a head 21, by means of which it may be rotated, and at the opposite end with a locking device 22 such as a nut, by means of which it may be clamped to the die block to hold it against revolution. Preferably the slots 19 extend the entire width of the block, as shown in Figures 1 and 3, and are closed at their ends by removable plates 23 which, for all practical purposes, are parts of the die block and in which the screws are in reality journalled. Each die body is axially bored as at 24 and contains an axially movable plunger or rod 25, which forms the die bottom and which rests against the front surface of a wedge 15. It will thus be seen that the die bodies have fixed seats whereas the die bottoms have movable seats, so that by adjusting the seats the die bottoms may be moved relatively to the die bodies. For the sake of strength, the rear portion of each die bottom may be enlarged as clearly shown in Figures 4 and 5. The rear ends of the die bottoms may project beyond the rear ends of the die bodies, as indicated in Figures 4 and 5, or the die bodies may be provided with diametrically disposed slots 26, in which the wedges 15 may operate, so that the die bottoms need not project beyond the bodies as shown in Figure 2.

The form of the roughing die, which as shown in Figure 4 is for the manufacture of a square head bolt, is very important. The opening 27 of this die is substantially cylindrical in its inner part 28 and of substantially the same diameter as the stock to be operated on. The outer part 29 of the opening is flaring and partakes somewhat of the shape of the bolt head which is to be made. That is to say, for the square headed bolt to be made, the flaring part 29 tapers gradually from the cylindrical inner portion 28 to a square opening at the face of the die, the opening being slightly smaller than the size of the finished head. In the finishing die shown in Figure 5, the opening 30 is the size of the finished head and the end 31 of the die bottom is shaped to give the desired form to the head. This die bottom may be set a little further back from the face of the die than the finished thickness of the bolt head requires, in order that the gripping die holding the stock may enter slightly in the opening as indicated at 32. By this means, any surplus metal which would otherwise form a fin around the base of the head will be sheared off between the edges of the gripping die and the edges of the heading die.

An important feature of the process lies in the ability to make a perfect head using only the exact amount of metal necessary, so that there is no surplus to be sheared off with the result that it is not necessary to have the gripping die enter the finishing die, as a perfect head without any flash will be produced if the gripping and finishing dies both have plain faces and merely come together.

The operation of the device is extremely simple. In setting up the machine to make a given bolt, the bottom of the roughing die is first adjusted to permit the entrance into the die of just the amount of metal necessary to make the bolt head. The bottom of the finishing die is adjusted to give the desired thickness of head and a slight set back is allowed if the gripping die is of a type to enter the heading die. If the gripping dies of the machine are not adapted to enter the heading die, the bottom of the die is of course set back from the face only the thickness of the finishing head. On the first operation of the machine, a length of stock protruding from the gripping die is relatively forced into the roughing die and its end is driven back, so that the metal swells or bulges out to fill the flared portion at the face of the die. This assures a well formed and sound bottom surface on the head. The die block now retreats in the usual manner, leaving the stock in the gripping die and either the gripping die or the die block shifts to align the stock with the finishing die. On the second stroke of the machine, the rough formed head is relatively forced into the heading or finishing die and is upset or expanded to completely fill the die in the well known manner. It has been found by experiment that if a sound, well formed head is to be produced, especially if the head is of large diameter in comparison to the stock, it is essential to form the under surface of the head and obtain a proper upsetting and consolidation of the metal in this part and also in the shank of the bolt which forms in the usual manner in the gripping die before the upsetting of the end of the stock is attempted. If the end of the stock is first upset, the action is a mushrooming one and it is very difficult, if not impossible, to produce a well shaped under surface for the head and to obtain a proper soundness of the metal in the under surface. It has also been found that the metal must be upset to the shape of the under surface of the bolt head before the finishing is effected for the reasons just given. The action is particularly noticeable in the making of square headed bolts and it will be found that unless the metal is flowed outwardly to form the lower corners of the head in the roughing operation that it will not flow in subsequent operations unless heat and pressure are applied beyond the limits of commercial practicability.

The roughing operation has also been found to be essential for the purpose of thickening the metal near the gripping die, so that it will remain centrally disposed in the finishing die and will expand uniformly. If it is attempted to make the head in one operation the metal will usually bend or buckle before any real upsetting occurs, thus producing an ill formed head and probably bursting the die. The roughing operation is also found to be essential to the producing of a well formed shank if such is desired.

In forming bolt heads there is often a fin or flash produced at the lower surface of the head by metal squeezing outwardly between the faces of the heading and gripping dies. This is due to the necessity in the processes used to-day of providing a surplus amount of metal in order to ensure the filling of the heading die and the formation of a perfect head. The existence of this fin necessitates an additional sizing or trimming operation before the bolt is fit for use. According to the present process this additional operation is entirely avoided, the reason being solely the preliminary formation of the lower surface of the head as a preliminary step and the accurate adjustment of the stock feed gauge and the roughing die. In the finishing operation there is no surplus of metal and so there is therefore nothing to squeeze out and form a flash. The lower corners of a polygonal bolt are the parts difficult to form but as these are formed to substantially full size in a preliminary operation this part of the head serves to close the mouth of the finishing die as the same contracts the gripping die, so that a true upsetting operation is performed. It is essential that a proper relation exist between the lengths of the taper and the parallel portion of the rough formed stock. No definite rule can be laid down for this relation on account of the differences in the shapes of heads but for square or hexagon heads or for round headed bolts with a square shank it may be stated that the tapered portion of the rough formed stock should be from one-third to one-half the length of the metal projecting beyond the gripping die when the forming operation is completed. This proportion will give sufficient support to the metal to prevent buckling in the subsequent finishing operation. Obviously the smaller cross section of metal at the extremity of the stock will upset more readily in entering the finishing die than will previously upset metal of larger cross section adjacent the gripping die. The form of the rough finished stock will be readily understood from an inspection of Figures 7, 8 and 9.

In cone headed bolts or bolts with special heads where the upper and lower surfaces are disposed at an acute angle, it is obviously necessary that there shall be a peripheral portion of some thickness to avoid a very sharp edge which would be dangerous to handle, difficult to form and which will readily crumble away. This formation is ordinarily produced by the trimming operation to which the bolts are subjected. According to the present invention this formation is readily effected by setting the bottom of the finishing die a slight distance back from the face of the body so that the short length of the body wall is exposed, as clearly shown in Figure 10.

If it is desired to make bolts with heads of standard diameter but slightly thicker than usual, all that is necessary is to adjust the wedges 15 so that the bottoms of the roughing and finishing dies will be set back. Obviously the stock feed gauge must be adjusted to permit the feeding of the necessary additional metal. This is an effect which absolutely cannot be obtained with the solid dies in general use, so that a smaller number of dies according to this invention will perform the same work as an ordinary number of dies and will enable orders for special bolts to be very quickly filled at much less expense than now prevails owing to the necessity of cutting special dies. It will also be understood that if there is no change in the diameter of a given type of head that a change in the shape of the outer surface may be effected by changing the bottom of the finishing die.

While the invention has been illustrated and described only as being made in two portions it may be observed that three or more portions may be used without departing from the spirit of the invention, by the insertion of the necessary number of additional dies between the roughing and finishing dies, a larger holder being of course necessary.

From the foregoing description it will be seen that bolts having all shapes of heads and in a great variety of sizes may be made automatically according to the present process, whereas with a few exceptions in the smaller sizes of bolts it is now necessary to make the bolts individually by hand-controlled machines. The present process also entirely eliminates trimming and sizing operations and produces a head having sharp corners and edges which do not require further treatment after leaving the machine. The small size bolts can, at the present time, be made on automatic machinery but in the majority of cases the final trimming operation is required and as in this trimming the bolts are individually inserted in the machine by the operator it will be readily seen that the advantage of the rapid production of the automatic machine is lost by the slowness of the trimming operation unless a great number of trimmers are employed with consequent large capital expenditure. The present invention, therefore, enables bolts of many different styles and sizes to be made entirely automatically, so that the production obtained is greatly in excess of what can now be done and the production can be obtained at a much lower cost.

While the invention has been described only in relation to the manufacture of the ordinary forms of bolts, it will be understood that it applies also to the manufacture of rivets, coach and lag screws, splicing bolts and many other special forms and that the term "bolt" in the following claims must therefore be considered as a collective name for all manufactures of the class.

Having thus described my invention, what I claim is:—

1. In bolt making machines, a die holder, a die body therein, a die bottom movably mounted in the body, and means carried by the holder for adjusting the position of the bottom relatively to the body.

2. A device according to claim 1, in which the adjusting means comprises a wedge and positioning means therefor.

3. In a bolt making machine, a die carrier recessed for the reception of a die body and providing a seat for the die body, said carrier having a passage therethrough extending transversely of the die recess and communicating therewith, the bottom of said passage being inclined with respect to the bottom of the recess, a wedge located in said passage having its front surface perpendicular to the axis of the die recess and projecting thereinto, a screw for adjusting said wedge, bearings for said screw in the carrier, and means for locking the screws.

4. In combination with a device according to claim 3, a die body in the recess seated solely on the carrier, and a die bottom movably mounted in the body in the axial direction thereof and seated solely on said wedge.

5. In combination with a device according to claim 3, a die body seated in the carrier recess having an axially disposed bore and a diametrically disposed slot for the reception of the wedge, and an axially movable die bottom in the body seated on said wedge.

In witness whereof, I have hereunto set my hand.

THOMAS P. SHELLY.